United States Patent
White et al.

[11] Patent Number: 6,144,006
[45] Date of Patent: *Nov. 7, 2000

[54] METHOD OF MAKING AND/OR USING COPPER BASED ELECTRODES TO SPOT-WELD ALUMINUM

[75] Inventors: Dawn Roberta White, Ann Arbor; Richard Lawrence Allor, Livonia, both of Mich.; Jerald Edward Jones, Sr., Golden, Colo.

[73] Assignee: Ford Global Technologies, Inc., Dearborn, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/962,550

[22] Filed: Oct. 31, 1997

Related U.S. Application Data

[63] Continuation-in-part of application No. 08/642,182, May 6, 1996, abandoned.

[51] Int. Cl.$^7$ .............................. B23K 35/04; B23K 11/30
[52] U.S. Cl. ........................... 219/91.2; 219/119; 164/46; 427/61
[58] Field of Search .................................. 219/91.2, 117.1, 219/119; 29/527.5; 164/46, 122; 427/59, 61

[56] References Cited

U.S. PATENT DOCUMENTS

| | | |
|---|---|---|
| 1,074,285 | 9/1913 | Nolan . |
| 2,069,906 | 2/1937 | Vaders . |
| 2,311,750 | 2/1943 | Hensel et al. . |
| 3,045,331 | 7/1962 | Ang et al. . |
| 3,116,141 | 12/1963 | Rylander et al. . |
| 3,128,540 | 4/1964 | Gwyn et al. . |
| 3,515,542 | 6/1970 | Larsen . |
| 3,909,581 | 9/1975 | Stone et al. . |
| 4,517,033 | 5/1985 | Okumura et al. . |
| 4,818,283 | 4/1989 | Grunthler et al. . |
| 4,840,711 | 6/1989 | Joseph . |
| 5,039,478 | 8/1991 | Sankaranarayanan . |
| 5,126,528 | 6/1992 | Bush et al. . |
| 5,188,799 | 2/1993 | Mori et al. . |
| 5,391,854 | 2/1995 | Namba et al. ...................... 219/119 X |
| 5,611,945 | 3/1997 | Kuwabara et al. ...................... 219/119 |

FOREIGN PATENT DOCUMENTS

| | | |
|---|---|---|
| 1 565 945 | 4/1970 | Germany . |
| 0 264 626 | 9/1987 | Germany . |
| 53-120652 | 10/1978 | Japan . |
| 6478684 | 3/1989 | Japan . |
| 1/113183 | 5/1989 | Japan . |
| 95/11107 | 4/1995 | WIPO . |

*Primary Examiner*—Samuel M. Heinrich
*Attorney, Agent, or Firm*—Lorraine S. Melotik; Roger L. May

[57] ABSTRACT

A method for spot-welding aluminum workpieces with copper electrodes that comprises the steps of: (a) dissolving copper and one or more alloying elements X to yield an alloy that increases the liquidus of Al when dissolved in molten Al, super heating the alloy of copper and one or more elements X that normally have little or nor solubility in copper at room temperature, such super heating being a temperature at which X is soluble in copper, X being selected from the group of Mo, Ta, V, and W, elements that form monotectic or peritectic phases with copper and aluminum devoid of an eutectic, X being present in an amount of 4–15% by weight of the copper; (b) rapidly cooling the alloy to room temperature to retain such elements in solid solution; (c) either concurrently or subsequent to step (b), forming the alloy as an electrode shape; and (d) passing current through the electrode shape to effect spot-welding of the aluminum workpieces when pressed thereagainst while extending the welding life of the electrode. Super heating and rapid cooling may be carried out by atomizing a melt of Cu and X with a pressurized gas that directs the spray onto a target for further cooling and eventual working or shaping.

7 Claims, 5 Drawing Sheets

METHOD OF MAKING AND/OR USING COPPER BASED ELECTRODES TO SPOT-WELD ALUMINUM

RELATED APPLICATIONS

This is a continuation-in-part application of U.S. Ser. No. 08/642,182 filed May 6, 1996 now abandoned entitled "Method Of Using Copper Based Electrodes To Spot-Weld Aluminum".

TECHNICAL FIELD

This invention relates to the technology of spot-welding metallic pieces and more particularly to spot-welding of aluminum with increased electrical effectiveness and electrode durability.

DISCUSSION OF THE PRIOR ART

Copper electrodes have been used for some time in the spot-welding industry because of their excellent thermal and electrical conductivity and because copper tends to provide the best specific resistance for the welding electrode due to thermal gradients established in the electrode; copper also provides the best contact resistance for the welding electrode because it retains its rigidity and hardness with a high degree of success.

However, copper electrodes deteriorate rapidly when used to perform mid-frequency DC spot-welding of aluminum sheet material. This is due mainly to a low melting point eutectic alloy that forms at the interface between the electrode and the sheet material. The formation of the eutectic results in rapid erosion of the copper electrode, and presents problems associated with non-uniform and porous nugget formation and nugget shape. (nugget being the melted material that forms the weld joint).

It is known how to dispersion harden copper electrodes for spot-welding zinc-galvanized steel sheet to avoid brittleness at high temperature use (see U.S. Pat. No. 4,818,283). This dispersion hardening is carried out by dissolving molybdenum in copper above the copper melting point, using a superheat (such as 200–1000° C.), followed by rapid cooling of about $10^{4°}$ C. per second. Unfortunately, such known dispersion hardening technique fails to recognize or perceive that a certain class of alloying ingredients will suppress the formation of eutectics of aluminum and copper. There is no appreciation that molybdenum, as a representative of such class, would be of service in extending the life of copper electrodes when used to spot-weld aluminum.

SUMMARY OF THE INVENTION

It is an object of this invention to reform the composition of copper electrodes to suppress or retard the formation of low melting point eutectics with aluminum by employing alloying ingredients that retard such formation and at the same time remain in solid solution even at room temperature.

The invention herein meets such object by a method for making and using copper based electrodes to spot-weld aluminum workpieces that comprises the steps of: (a) dissolving copper and one or more alloying elements X to yield an alloy that increases the liquidus of Al when dissolved in molten Al, the copper and X being super heated to an elevated temperature at which X is soluble in copper, X being selected from the group of Mo, Ta, V, and W, elements that form monotectic or peritectic phases with copper and aluminum devoid of a eutectic when X is present in an amount of 4–15% by weight of the copper; (b) rapidly cooling the superheated alloy to room temperature to retain such elements in solid solution; (c) either concurrently or subsequent to step (b), forming the alloy as an electrode shape; and (d), passing current through the electrode shape to effect spot-welding of the aluminum workpieces when pressed thereagainst while extending the welding life of the electrodes.

Super heating and rapid cooling may be carried out by atomizing a melt of Cu and X with a pressurized gas that directs the spray onto a target for further cooling and eventual working or shaping. The super heating and rapid heating may also be carried out by concurrently melting powers of Cu and X through use of a thermal spray gun or a laser beam. Either of these modes may be used to create a solid electrode comprised entirely of the alloy or used to create a clad layer or clad tip on a previously shaped copper electrode with X being present only in such layer or tip.

Alternatively, a solution of X in the copper may be achieved by compacting a mixture of nano-sized particles of X and Cu under sufficient pressure to achieve virtual solution of X in Cu even at room temperature resulting from the intimacy of the particles at their interfaces.

Figure 1:
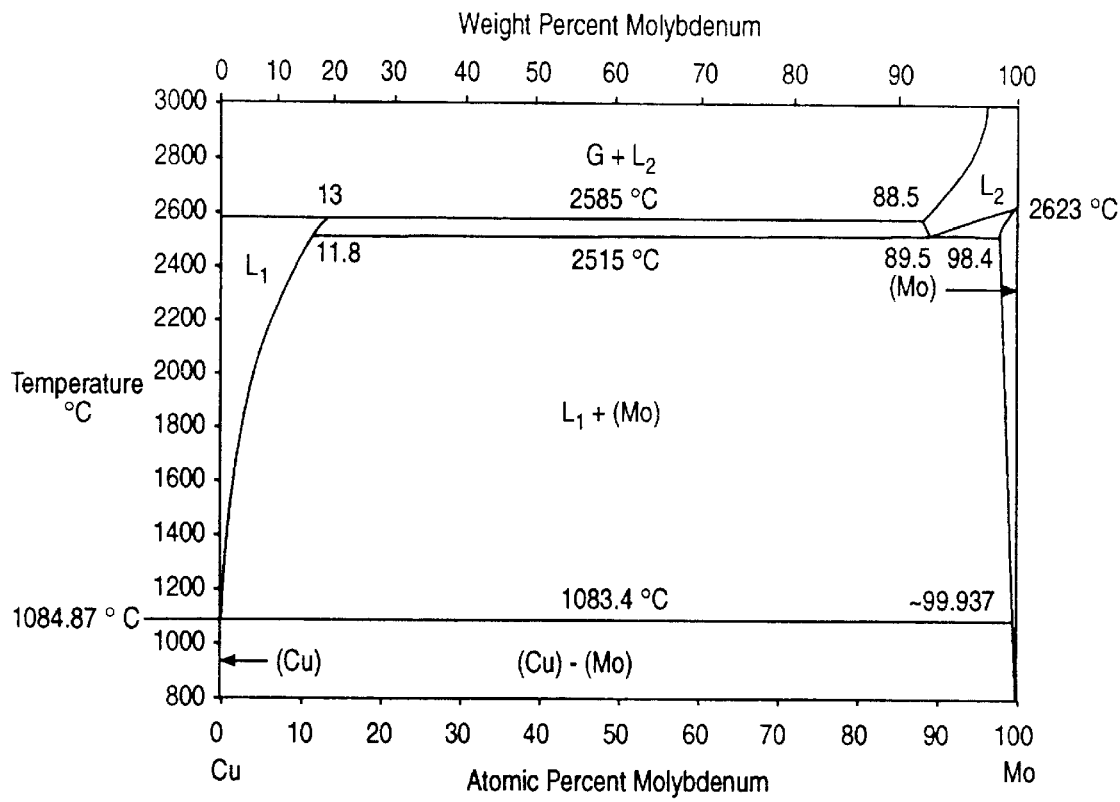
FIGS. 1 and 1A are respectively phase diagrams of an alloy of Cu and Mo, and an alloy of Al and each Mo, diagram indicating monotectics of the alloy.

The mechanism of spot welding electrode deterioration, that occurs during spot welding of aluminum, differs considerably from that observed during welding of steel or galvanized steel. A non-uniform breakdown of the strong, adherent aluminum oxide layer at the surface of the aluminum workpiece results in severe current constriction during welding. This current constriction produces elevated temperatures and local melting of the aluminum. Copper is highly soluble in molten aluminum so that after the local melting occurs, some of the copper electrode is dissolved by it, and a low melting point eutectic forms. As a result, in the next welding cycle, molten material can form at a lower temperature, and extremely rapid dissolution of the electrode, can occur. To understand this mechanism, imagine that an attempt is made to spot weld ice with salt electrodes. It might work well if the ice remained completely solid during the welding process, but if a small amount of water formed at the surface of the ice, the salt electrode would dissolve. This is what occurs when aluminum melts in the presence of copper.

The effect of copper in depressing the melting point of aluminum is easily seen from an aluminum copper phase diagram. Since other common alloying elements in aluminum sheet metal, such as silicon and magnesium also or eutectics, the melting point of the liquid at the interface is actually lower than the 548° C. shown. A CuMgAl ternary eutectic with a melting point nearly 100° C. lower can also form during welding of automotive sheet aluminum alloys strengthened with Mg.

In much of the literature, deterioration of spot welding electrodes is associated with the pickup of aluminum on the electrode. Numerous researchers have characterized the condition of the electrode surface. Generally, a thin layer of aluminum bearing eutectic is found, and in some cases molten aluminum attack of the grain boundaries in the electrode is observed. However, it is clear that although the electrode surface assumes a silvery appearance as the deterioration proceeds, little aluminum is transferred to the electrode surface. Our studies show only a small amount of Cu—Al eutectic adheres to the surface of the electrode. The mechanism of failure is in fact dissolution of the electrode in molten aluminum despite the "aluminum pick-up" phrase used commonly to describe electrode deterioration. The dissolved copper must be redeposited, since it does not remain on the electrode. Large quantities of the Cu—Al eutectic are deposited on the workpiece. In light of the large amount of deposited eutectic, it is not difficult to understand the source of the high rate of electrode wear experienced in production. However, since the Cu—Al compound formed is silvery in color, the deposit of this material is not readily noticed during casual observation, whereas the very small amount of aluminum on the electrode is easily seen because its color differs from that of the electrode.

This invention slows the deterioration of the electrode to make it insoluble in molten aluminum; use of V, Mo, Ta, or W in the electrode provides a significant technical difference. The use of such elements is not to strengthen the electrode, prevent embrittlement, provide a cooler electrode surface, or resist attack by zinc during joining of galvanized sheet metal.

Although molten aluminum is an excellent solvent and dissolves copper to yield an alloy with a melting point lower than that of pure aluminum, there are a number of metals which are not readily soluble in molten aluminum, and which in fact elevate the liquidus temperature of aluminum when they are dissolved in it (represented by V, Mo, Ta and W).

Figure 10:
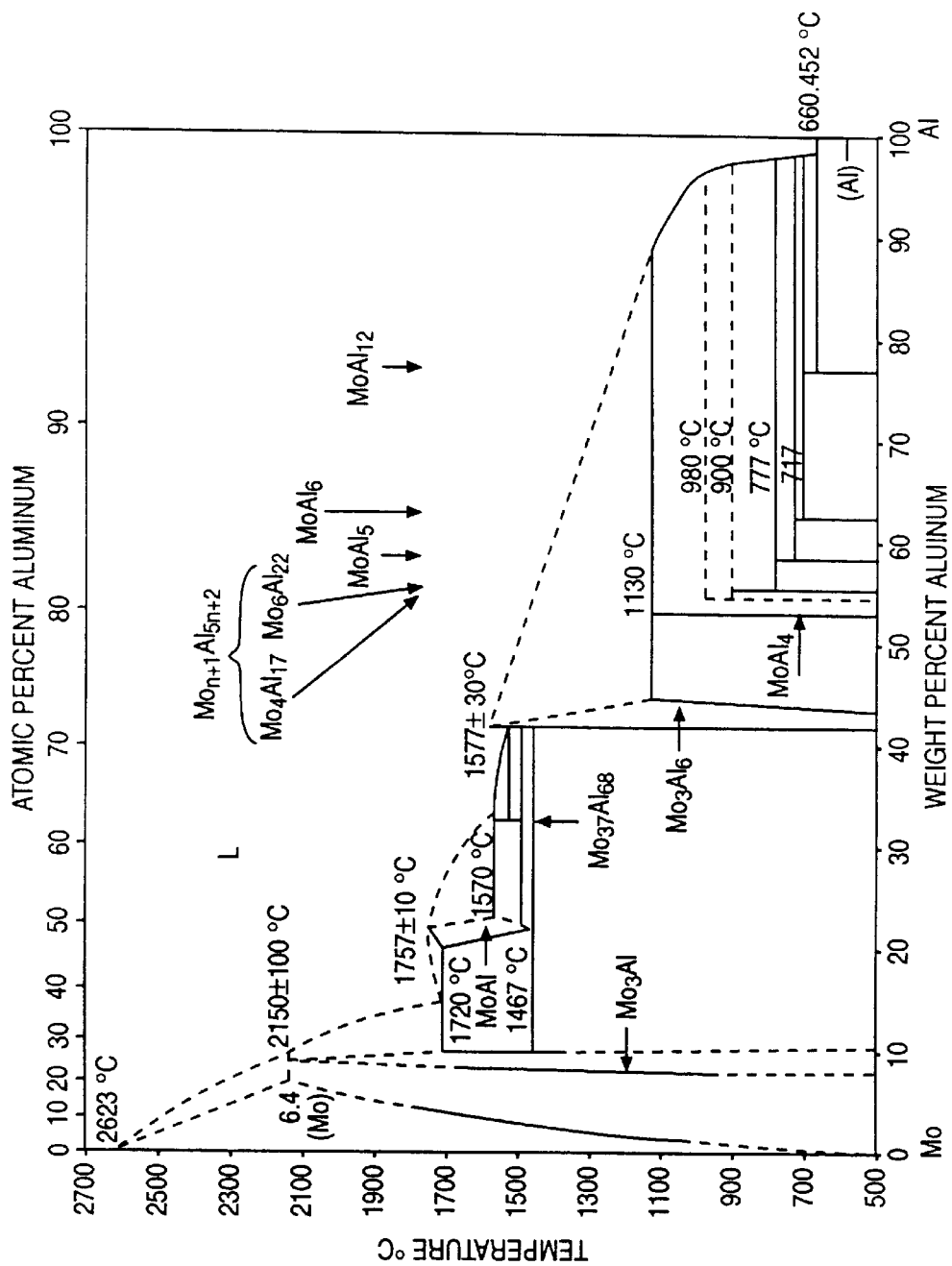
FIG. 10 is an aluminum-molybdenum phase diagram.
Figure 11:
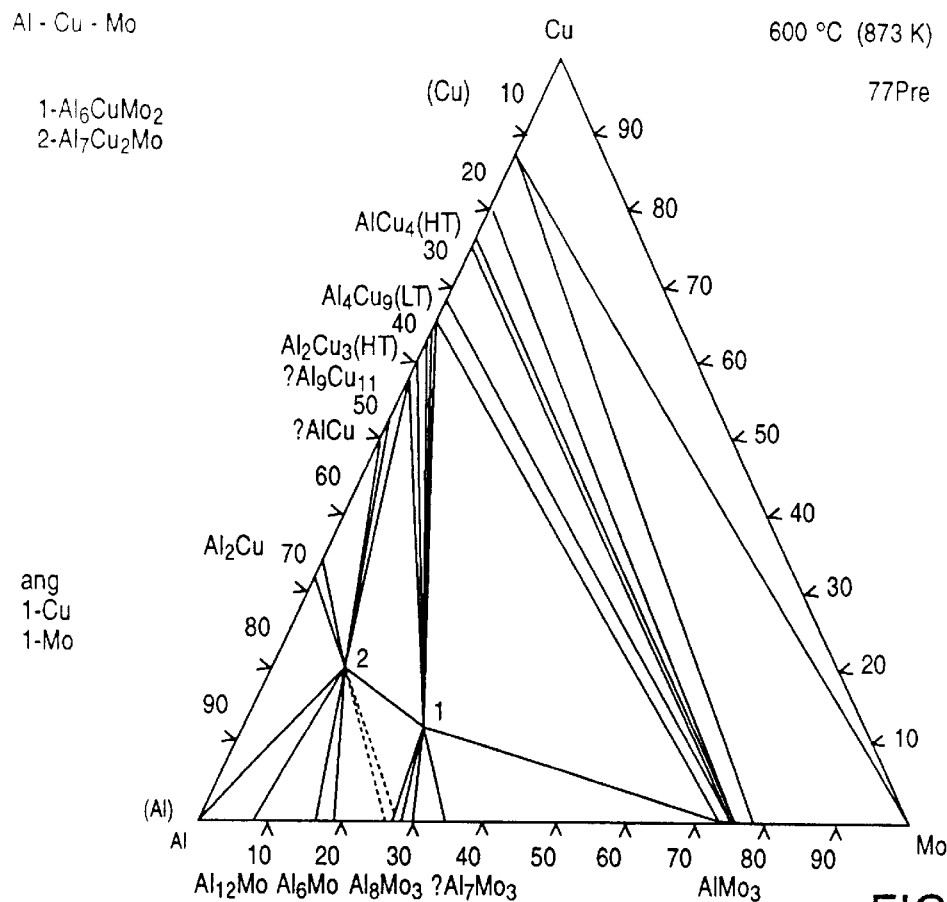
FIG. 11 is a Cu—Mo—Al phase diagram.
Figure 12:
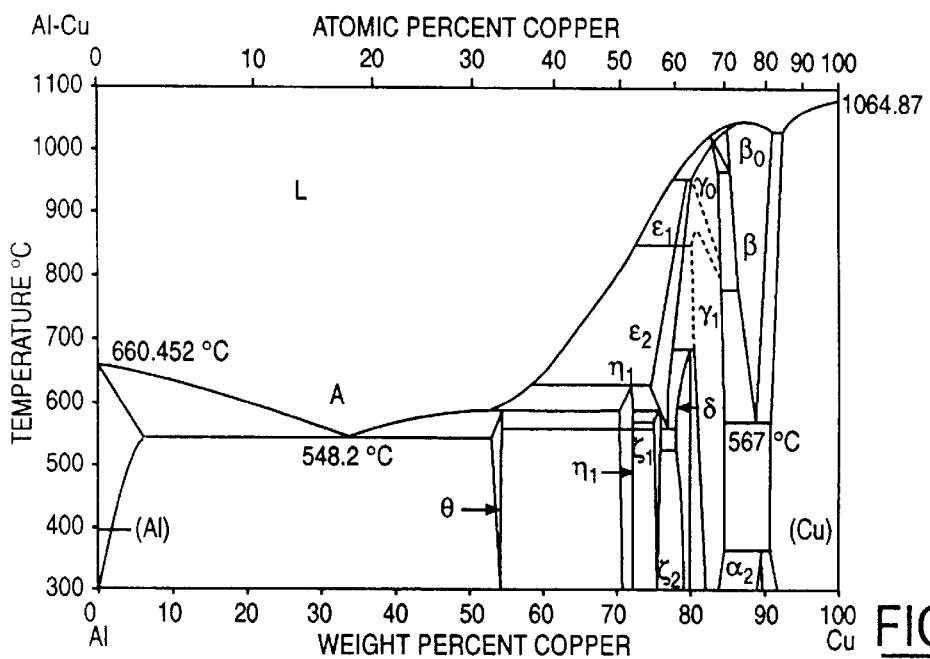
FIG. 12 is a Cu—Al phase diagram.

FIG. 10 is an aluminum-molybdenum phase diagram illustrating how the liquidus of Al is increased. It is readily seen that only small amounts of molybdenum can be dissolved in molten aluminum, and that the liquidus increases rapidly along with molybdenum content. A similar situation prevails when molybdenum is dissolved in copper. There is no solid solubility of Mo in Cu, and the liquidus temperature rises quickly as Mo is dissolved in molten copper. The ternary Cu—Mo—Al phase diagram does not show the presence of any liquid at 600° C. as seen in FIG. 11. This means that if a small amount of molybdenum can be dissolved in the electrode, it will be much less soluble in the presence of molten aluminum during spot welding operations than a conventional electrode.

This possibility of suppressing the formation of the low melting point eutectic forms the basis of this invention. Electrode materials which are formed by alloying copper with materials which form a monotectic with both copper and aluminum create such suppression. There are only a small number of such metals, most of them refractories. Some candidates are vanadium (V), tantalum (Ta), molybdenum (Mo) and tungsten (W). There are a number of considerations in determining alloy element composition, including the conductivity of the alloying element and the amount required in solution with molten aluminum to significantly affect the liquidus temperature. Table 1 shows the conductivity of some of the relevant materials. Molybdenum has by far the best conductivity of the refractory metals, and a relatively small quantity of it is soluble in aluminum. Vanadium has a lower solubility in aluminum but has a much higher resistivity. However, since vanadium has a considerably smaller atom than Mo, it affects the conductivity of copper less when in solution than Mo, since it will produce lower lattice strains.

TABLE 1

| Resistivity of Pure Metals (in $10^{-8}$ Wm) | | | | |
|---|---|---|---|---|
| Copper | Aluminum | Molybdenum | Tantalum | Vanadium |
| at 298° C. | | | | |
| 1.712 | 2.709 | 5.47 | 13.4 | 20.1 |
| at 627° C. | | | | |
| 6.041 | 10.18 | 21.2 | 40.1 | 58.7 |

Producing alloys of copper and these refractory materials present important difficulties since by definition, an alloy system which forms a monotectic is one in which the alloying elements are mutually insoluble. In addition, the melting point of molybdenum is very high (2630° C.), and oxides readily, so conventional ingot metallurgy is difficult and costly. Non-equilibrium processing methods must be used to overcome these problems.

Thus, copper electrode deterioration in the spot-welding of aluminum can be suppressed or eliminated by use of an unique family of alloying ingredients that, when deployed at the electrode interface, suppresses the formation of eutectic alloys between the copper electrode and the aluminum sheet being welded. The family of ingredients, although not usually stable in solution at room temperature in copper, are carefully processed so that total solution of such ingredients in copper will continue at lower temperatures, even to room temperature and below.

Figure 1A:
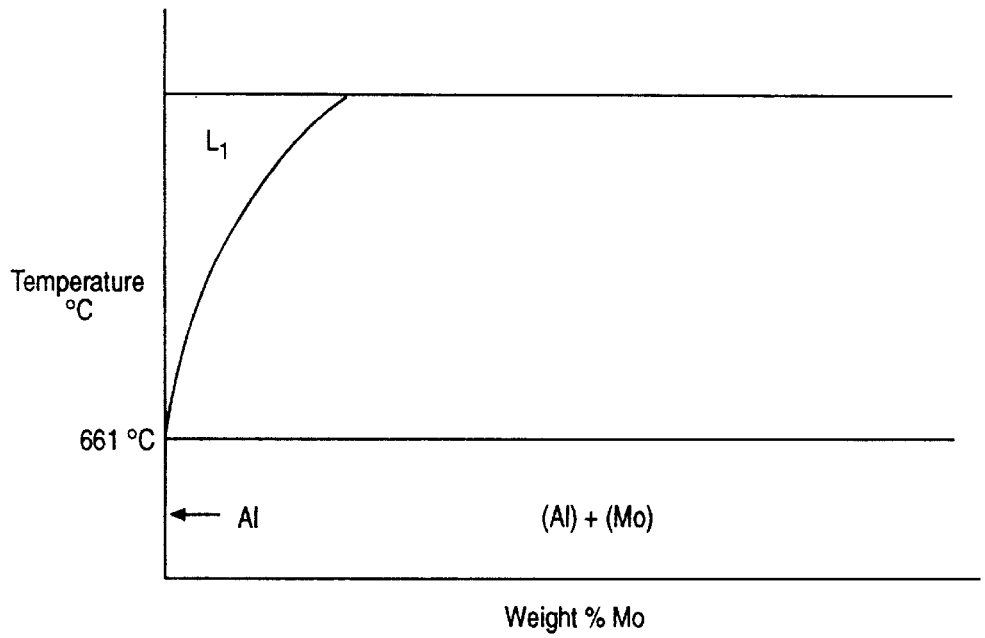

To this end, the electrode interface is fabricated with alloying ingredients X selected from the group consisting of tungsten, vanadium, tantalum, molybdenum, elements that suppress eutectics in Cu and Al. This group is characterized by (a) an inability to form an eutectic with aluminum and, when the Cu—X alloy is dissolved in aluminum, it increases the liquidus of aluminum, and (b) does not form an eutectic with copper and instead forms a monotectic or peritectic reaction (see the phase diagrams of FIGS. 1 and 1A). The alloying ingredients can be added in an amount of 4–15% by weight of the copper to assure that a sufficient amount of the alloying element is present in the copper to exceed the limit of solubility of the element in aluminum when copper is dissolved in aluminum during melting as occurs during spot welding.

Figure 2:
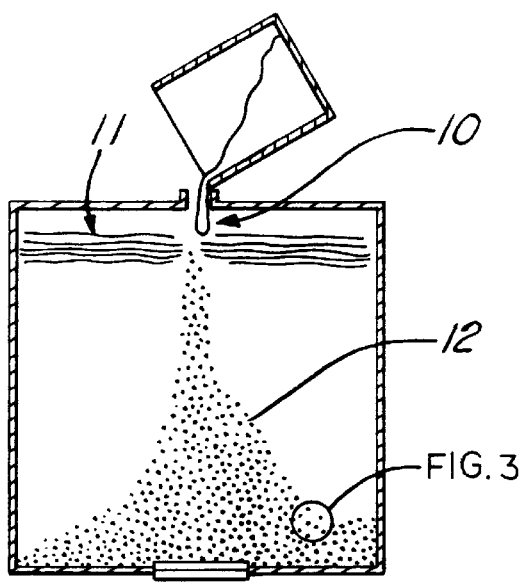
FIG. 2 is a schematic illustration of one process for carrying out super heating and rapid cooling of this invention utilizing atomization of a melt of copper and X, X being an element selected from W, V, Ta and Mo.
Figure 4:
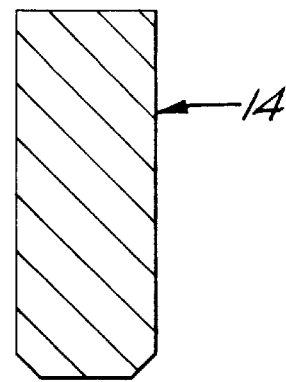
FIG. 4 is an elevational cross-sectional view of a typical electrode that can be formed and shaped by the process of FIG. 2.
Figure 3:
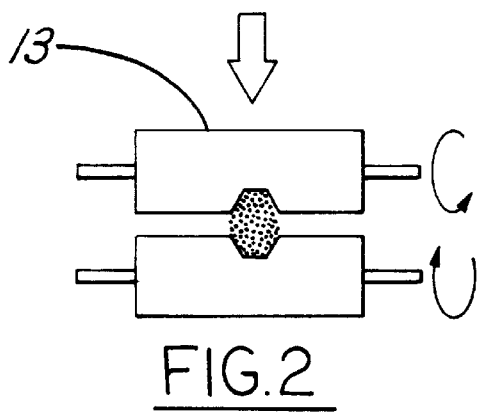
FIG. 3 is a highly enlarged schematic illustration of the structure of one particle formed by the process of FIG. 2.

As shown in FIG. 2, a process that will elevate the melting temperature of any liquid that may begin to form at the electrode interface during spot-welding comprises firstly atomizing a super heated melt 10 of copper and X (X being present in amount of 4–15% by weight of the copper). Atomization is carried out by use of a high pressure gas 11 that comminutes the melt into particles 12 of a size of about 10–300 microns. The superheating is preferably in the range of 1000–1500° F. above the melting temperature of pure copper. Although X is normally not soluble in copper at room temperature, rapid cooling at a rate of 103° F./minute will trap X in the copper matrix as well as distribute it as a very small disperoid. The collected particles 12 may then be compacted or forged by a machine 13 to form an electrode shape 14 as shown in FIG. 4. This subsequent cold working will produce a wrought copper-X alloy with X remaining trapped in solid solution in a very finely dispersed form (0.5 microns or less). As shown in FIG. 3, the atomized particles will be a mixture of dispersed X elements 15 within a matrix 16 of copper. The rapid cooling produces particles having a size of about 50 micrometers, with a melting temperature of each particle being about 1800° C.

Alternatively, the spray from the atomization process may be directed onto a substrate and immediately form a coalesced bulk product that is close to the net shape of an electrode, thus requiring little reworking.

Figure 5:
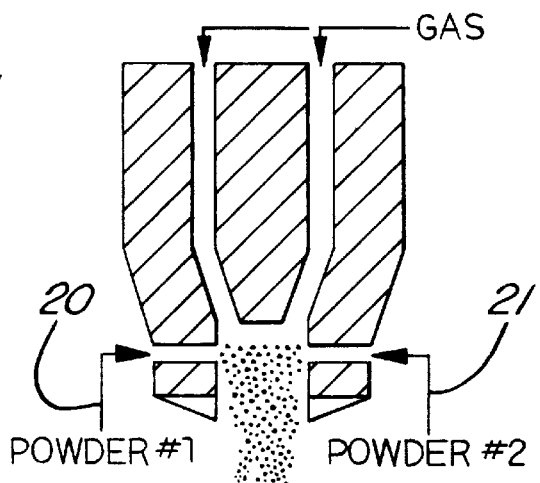
FIG. 5 is a schematic illustration of an alternative process for carrying out this invention employing concurrent melting of copper and X powders by use of a thermal spray gun.
Figure 5:
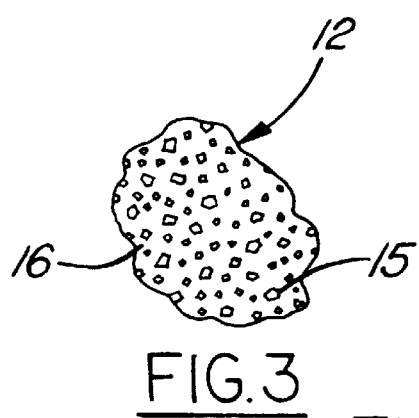

Instead of atomization, separate powder supplies of copper (20) and X (21) may be milled to nano scale particles (10–30 microns) and blended together in a proportion to accept 4–15% by weight of X (see process in FIG. 5). The homogeneously alloyed particles 22 are then compacted under sufficient force and heat by device 23 to initiate the formation of a solid that has an amorphous microstructure with virtual solid solution of X in copper. Such formation of the amorphous microstructure may be accompanied by heat at a temperature of about 500° F. As a result of the process of FIG. 5, X will be in the particle boundaries of the copper, consistent with being an extremely small disperiod of X in copper (0.5 microns spacing or less) and thereby will prevent copper from being preferentially dissolved during the spot-welding operation. Compaction of such nano scale particles into a forged electrode shape, as shown in FIG. 5, will provide certain advantages, namely high strength and ductility combined with the necessary dispersion of the alloying element in the copper.

Figure 6:
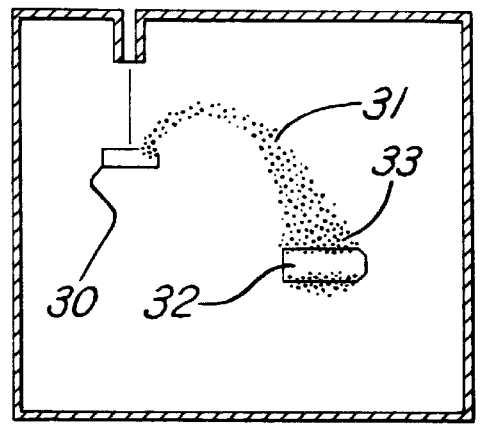
FIG. 6 is a schematic illustration of ion implantation of X alloying material into the surface region of a copper electrode.
Figure 8:
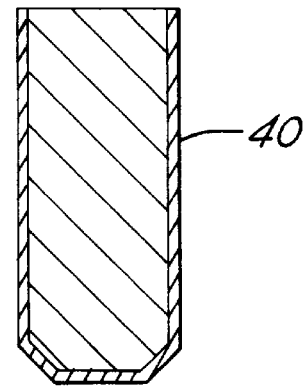
FIG. 8 is a schematic elevational view of an electrode which has been clad by the use of the process of FIG. 7.
Figure 7:
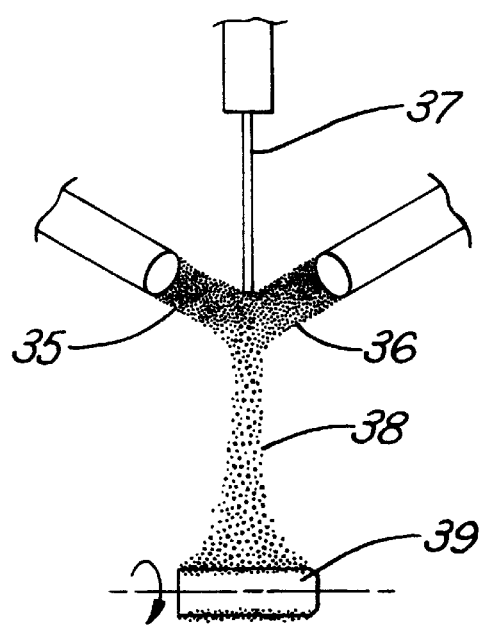
FIG. 7 is a schematic illustration of yet another alternative process of carrying out super heating and rapid cooling of this invention employing concurrent melting of powders of copper and X utilizing a laser beam.

As shown in FIG. 6, the extended solubility of X in copper at room temperature may also be achieved by ion implantation. A material 30, constituting X, is eradicated to form an ion vapor 31 that migrates to copper target 32, such as a reformed copper electrode; the ions 31 bombard the surface 33 of such electrode to create a surface region with X in solid solution. Cladding may also be obtained, as shown in FIG. 7, by injecting copper and X powders (35, 36) into a laser beam 37 where the powders will be melted and X dissolved into the copper. When the melted particles 38, from this laser beam intersection, are deposited on a substrate 39, such as a previously formed copper electrode, a very high cooling rate results and large extensions of solid solubility will occur in such a system. This, of course, results in a surface treated electrode that will retain very high electrical conductivity in the core of the electrode while avoiding the added expense of fabricating the entire solid mass of the electrode with anti-eutectic forming material that may retard conductivity somewhat. The resulting clad electrode, formed either by ion implantation or by concurrent melting and spraying of feed powders, will have an appearance as that shown in FIG. 8.

Not only is the production of copper-X alloys expensive, the addition of the alloying element lowers electrical conductivity, a principal characteristic of the electrode. An electrode with an uniform CuX composition will therefore be expensive and conduct less effectively than a conventional electrode; this is offset by the ability of the electrode to be long-lived. Cladding, however, produces a Cu—X layer 40 (see FIG. 8) on a conventional copper electrode that not only will have a longer life but also reduces the need for a costly CuX alloy.

Figure 9:
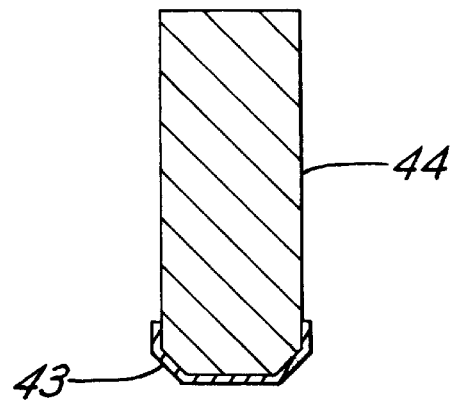
FIG. 9 is a sectional elevational view of an electrode that has been clad by the process of FIG. 7 but limited to the formation of a cap or tip for the electrode.

A variation of this cladding concept would be the formations of a compound electrode 42 (see FIG. 9)by brazing a cap 43 of a copper-X alloy onto the previously formed solid copper electrode 44. Instead of making the whole electrode out of the more expensive Cu—X alloy, a thin cap of the Cu—X material is brazed onto the copper electrode using high conductivity braze material, such as silver, thus lowering the cost of the electrode and extending its life.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

What is claimed is:

1. A method of making and using copper-based electrodes to spot-weld aluminum workpieces comprising:
   (a) dissolving copper and one or more alloying elements X to yield an alloy that increases the liquidus of Al when dissolved in molten Al, said copper and X being super heated to an elevated temperature at which X is soluble in copper, X being selected from the group of tungsten and vanadium elements, said elements forming phases with copper and aluminum devoid of an eutectic, when X is present in said copper in an amount of 4–15% by weight of the copper;
   (b) rapidly cooling said alloy to room temperature while trapping X in solid solution within said copper;
   (c) either concurrently with or subsequent to step (b), forming said alloy as an electrode shape; and
   (d) passing current through said electrode shape to effect spot-welding of said aluminum workpieces when pressed thereagainst while suppressing formation of low melting Al/Cu eutectics and thereby extend the welding life of the electrode.

2. The method as in claim 1 in which dissolving and rapid cooling is carried out by atomizing a melt of copper and X by use of a high pressure gas to form a spray, and directing the atomized spray onto a target for further cooling or working or shaping to form the electrode.

3. The method as in claim 1 in which dissolving and rapid cooling is carried out by concurrently melting powders of both copper and X by use of a thermal spray gun or a laser beam.

4. The method as in claim 1 in which said dissolving and rapid cooling is carried out to provide a clad layer or tip on a previously formed solid copper electrode as the target.

5. The method as in claim 1 in which dissolving and rapid cooling is carried out by evaporation of X to form ions, which ions migrate to a copper electrode target, said ions implanting into the outer surface region of said copper target to form a surface treated copper electrode having X in solid solution in said surface region in said weight amount.

6. The method as in claim 1 in which copper and X are dissolved to form an alloy that coats only the tip of a preformed copper electrode thereby constituting a thin cap at the working end of the electrode.

7. A method of using a copper-based electrode comprised of a superheated alloy of Cu and X rapidly cooled to retain X in solution, X being selected from tungsten and vanadium, and X being present in the alloy in a weight amount of 4–15%, comprising: passing current through said electrode to effect spot-welding of aluminum workpieces while said electrode is pressed thereagainst, said alloy suppressing the formation of eutectic alloys between the electrode and Al workpieces which would tend to decrease the liquidus temperature of Al, the alloy providing decreased solubility of the electrode in molten aluminum as a result of increasing the liquidus temperature of molten aluminum and thereby prolonging the welding life of said electrode.

* * * * *